(12) United States Patent
Kwon et al.

(10) Patent No.: US 10,434,958 B2
(45) Date of Patent: Oct. 8, 2019

(54) HEADLINING HAVING HEAT SHIELDING FUNCTION FOR VEHICLE AND MANUFACTURING METHOD THEREOF

(71) Applicant: DAEHAN SOLUTION CO., LTD, Incheon (KR)

(72) Inventors: Choong Ho Kwon, Seoul (KR); Jang Seok Park, Incheon (KR)

(73) Assignee: DAEHAN SOLUTION CO., LTD, Incheon (KR)

( * ) Notice: Subject to any disclaimer, the term of this patent is extended or adjusted under 35 U.S.C. 154(b) by 882 days.

(21) Appl. No.: 14/840,792

(22) Filed: Aug. 31, 2015

(65) Prior Publication Data

US 2016/0347263 A1 Dec. 1, 2016

(30) Foreign Application Priority Data

May 28, 2015 (KR) .................. 10-2015-0075183

(51) Int. Cl.
*B60R 13/02* (2006.01)
*B32B 37/06* (2006.01)
(Continued)

(52) U.S. Cl.
CPC .......... *B60R 13/0212* (2013.01); *B29C 43/00* (2013.01); *B32B 5/028* (2013.01); *B32B 27/08* (2013.01); *B32B 27/20* (2013.01); *B32B 27/308* (2013.01); *B32B 27/36* (2013.01); *B32B 37/06* (2013.01); *B60R 13/0815* (2013.01); *B29C 43/203* (2013.01); *B29K 2105/167* (2013.01); *B29L 2031/3011* (2013.01); *B32B 5/022* (2013.01); *B32B 5/024* (2013.01); *B32B 7/12* (2013.01); *B32B 9/025* (2013.01); *B32B 9/045* (2013.01); *B32B 27/12* (2013.01); *B32B 27/306* (2013.01); *B32B 27/32* (2013.01);
(Continued)

(58) Field of Classification Search
USPC .................... 428/113, 77, 172, 423.9, 424.8
See application file for complete search history.

(56) References Cited

U.S. PATENT DOCUMENTS

2014/0127451 A1* 5/2014 Pilpel ................. B32B 5/12
428/113

FOREIGN PATENT DOCUMENTS

| KR | 0188709 B1 | 7/2000 |
| KR | 1192416 B1 | 10/2012 |
| KR | 1227628 A | 1/2013 |

* cited by examiner

*Primary Examiner* — Lynda Salvatore
(74) *Attorney, Agent, or Firm* — Bacon & Thomas, PLLC (57) ABSTRACT

A headlining having a heat shielding function for a vehicle and a manufacturing method for producing the headlining, where a complex layer formed of glass fiber and polypropylene is manufactured among various layers forming the headlining having a multilayered structure, and a hot melt film containing a heat shielding material is further provided on at least one of both surfaces of the complex layer to shield heat by the headlining. In so doing, the headlining is capable of reducing an internal temperature of the vehicle even in the summertime, and thus an operation time of an air conditioner is reduced, and fuel efficiency of the vehicle is increased. The headlining also has a heat shielding function for a vehicle, in which carbon nanotubes as the heat shielding material are used to provide the heat shielding and weight lighting effects and also to simultaneously improve the fuel efficiency of the vehicle.

8 Claims, 5 Drawing Sheets

(51) Int. Cl.

| | |
|---|---|
| *B32B 5/02* | (2006.01) |
| *B32B 27/08* | (2006.01) |
| *B32B 27/20* | (2006.01) |
| *B32B 27/30* | (2006.01) |
| *B32B 27/36* | (2006.01) |
| *B29C 43/00* | (2006.01) |
| *B60R 13/08* | (2006.01) |
| *B32B 27/12* | (2006.01) |
| *B32B 27/32* | (2006.01) |
| *B32B 37/12* | (2006.01) |
| *B32B 7/12* | (2006.01) |
| *B32B 9/02* | (2006.01) |
| *B32B 9/04* | (2006.01) |
| *B32B 27/34* | (2006.01) |
| *B29L 31/30* | (2006.01) |
| *B29C 43/20* | (2006.01) |
| *B29K 105/16* | (2006.01) |

(52) U.S. Cl.
CPC ....... *B32B 27/34* (2013.01); *B32B 2037/1223* (2013.01); *B32B 2250/05* (2013.01); *B32B 2255/10* (2013.01); *B32B 2260/021* (2013.01); *B32B 2260/046* (2013.01); *B32B 2262/0276* (2013.01); *B32B 2262/101* (2013.01); *B32B 2262/106* (2013.01); *B32B 2270/00* (2013.01); *B32B 2307/304* (2013.01); *B32B 2307/306* (2013.01); *B32B 2307/718* (2013.01); *B32B 2307/732* (2013.01); *B32B 2309/02* (2013.01); *B32B 2309/12* (2013.01); *B32B 2605/003* (2013.01); *B32B 2605/08* (2013.01)

HEADLINING HAVING HEAT SHIELDING FUNCTION FOR VEHICLE AND MANUFACTURING METHOD THEREOF

CROSS-REFERENCE TO RELATED APPLICATION

This application claims priority to and the benefit of Korean Patent Application No. 10-2015-0075183, filed on May 28, 2015, the disclosure of which is incorporated herein by reference in its entirety.

FIELD OF THE INVENTION

The present invention relates to a headlining having a heat shielding function for a vehicle and a manufacturing method thereof, and more particularly, to a headlining having a heat shielding function for a vehicle, in which a complex layer formed of glass fiber and polypropylene (PP) is used to shield heat introduced from an outside into an inside of a vehicle through a roof panel, and a hot melt film coated with a heat shielding material is further provided on at least one of both surfaces of the complex layer, and thus the heat introduced from the outside into the inside of the vehicle is shielded, an inside temperature of the vehicle is reduced, and also fuel efficiency of the vehicle is increased, and a manufacturing method thereof.

BACKGROUND OF THE INVENTION

Figure 1:
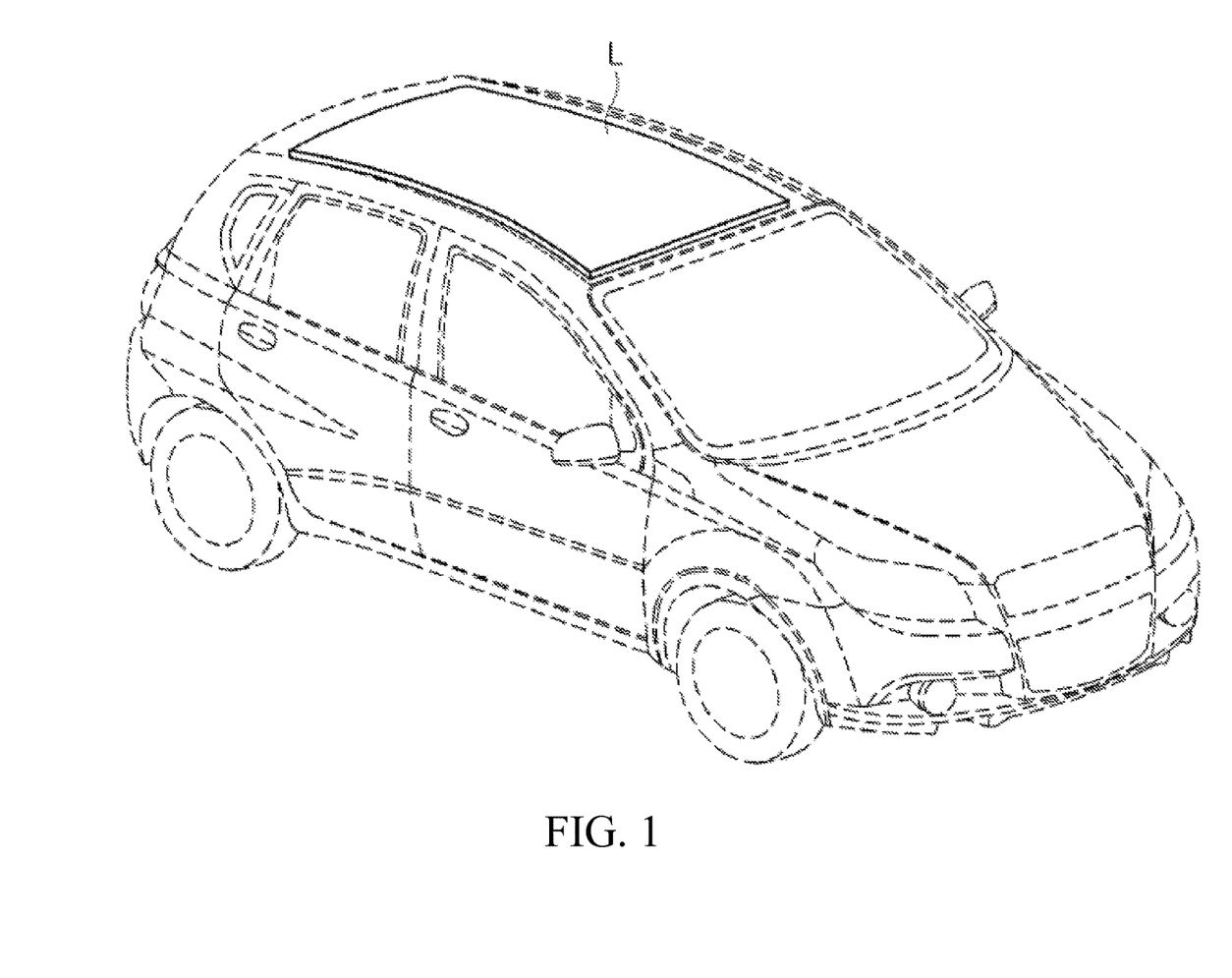
FIG. 1 is a perspective view of a vehicle illustrating an installation position of a headlining.
Figure 2:
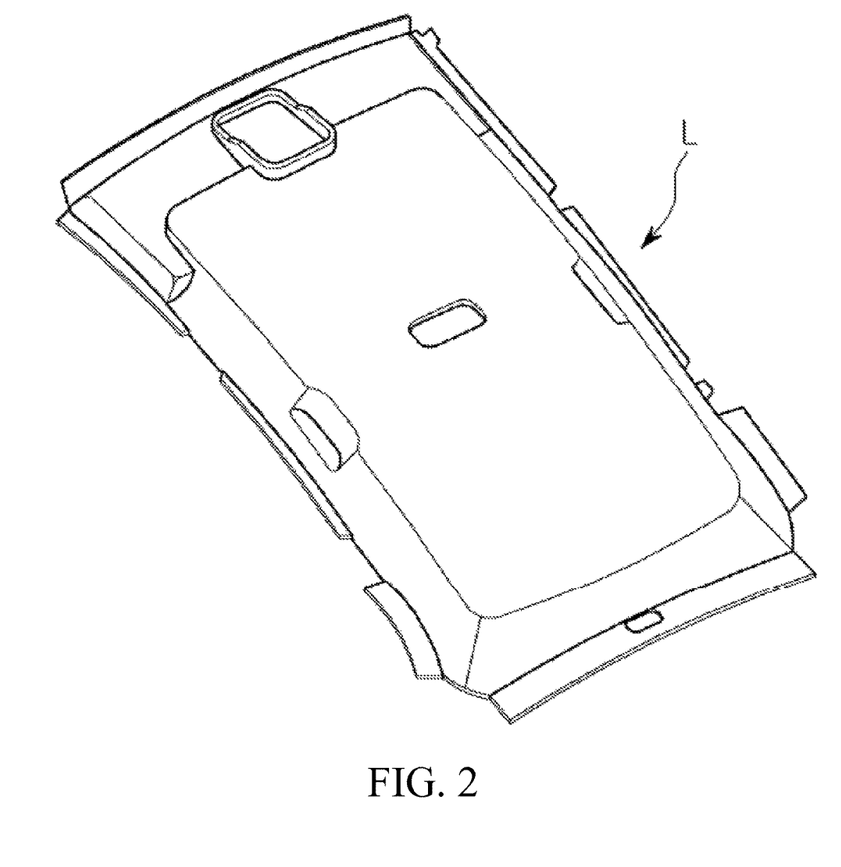
FIG. 2 is a perspective view illustrating a whole shape of a general headlining.

Generally, in a roof panel of a vehicle, as illustrated in FIG. 1, a headlining (L) is installed at an indoor side thereof to provide a buffer function, mood or the like, as illustrated in FIG. 2. The headlining (L) is fixed to a side roof rail by a clip, and formed of various materials such as vinyl and cotton, and serves as an insulating material against a temperature change from an outside. The headlining (L) is manufactured by various methods and of various materials, as described in the following patent documents 1 to 3.

The patent document 1 discloses a manufacturing method of the headlining, which is capable of strengthening an adhesive force of each layer of an acoustic head lining, while simplifying a manufacturing process thereof, and improving reliability of a product, and also preventing a thermal deformation of polyurethane foam, and thus providing excellent acoustic absorption performance.

The patent document 2 discloses a material of a headlining for a vehicle, which includes a first layer including natural fiber, polypropylene and polyethylene terephthalate, a second layer including thermoplastic (TF) foam, and a third layer including the natural fiber, the polypropylene and the polyethylene terephthalate, and is capable of realizing high acoustic absorption performance, environment friendliness and a light weight, and a manufacturing method thereof.

The patent document 3 discloses a manufacturing method of the headlining, which is capable of providing an excellent adhesive force by using adhesive powder having a graft polymer property, being manufactured in a simple process without using an adhesive film, compared with a conventional manufacturing method using the adhesive film and adhesive powder, reducing a manufacturing cost, improving inconvenience in using the adhesive film, and also providing an acoustic absorption effect in the vehicle by forming a permeable adhesive layer.

However, the conventional headlining has the following problems:

(1) The conventional headlining does not include a material which may shield or prevent heat of sunlight from being introduced into an inside of a vehicle through a roof panel in summertime.

(2) This causes an internal temperature of the vehicle to be rapidly increased, as the direct sunlight is applied to the roof panel in the summertime.

(3) Like this, when the internal temperature of the vehicle is increased, and a child or the old and the infirm stays for a long stretch of time, a safety accident, such as heat exhaustion and heatstroke, which can be prevented in advance may be caused.

(4) Also, when a canned drink or a lighter using gas as fuel is exposed in the hot inside of the vehicle for a long period of time, the drink or the lighter may explode and may cause a fire or damage to a driver or a passenger.

(5) When an air conditioner is operated in a state in which the roof panel is exposed to the sunlight for long time, heated air should be cooled, and energy consumption is increased, and thus fuel efficiency is reduced.

PRIOR ART DOCUMENTS

Patent Documents (Patent document 1) Korean U.M. Registration No. 0188709 (Registration date: Apr. 29, 2000)
(Patent document 2) Korean U.M. Registration No. 1192416 (Registration date: Oct. 11, 2012)
(Patent document 3) Korean U.M. Registration No. 1227628 (Registration date: Jan. 23, 2013)

SUMMARY OF THE INVENTION

The present invention is directed to a headlining having a heat shielding function for a vehicle, in which a complex layer formed of glass fiber and polypropylene (PP) is manufactured among various layers forming the headlining having a multilayered structure, and a hot melt film containing a heat shielding material is further provided on at least one of both surfaces of the complex layer to shield heat introduced into an inside of the vehicle through a roof panel and to provide an effect capable of reducing an internal temperature of the vehicle even in the summertime, and thus an operation time of an air conditioner is reduced, and fuel efficiency of the vehicle is increased, and a manufacturing method thereof.

Also, the present invention is directed to a headlining having a heat shielding function for a vehicle, in which carbon nanotubes (CNT) as the heat shielding material are added to provide the heat shielding and weight lighting effects and also to simultaneously improve the fuel efficiency of the vehicle, and a manufacturing method thereof.

Also, the present invention is directed to a headlining having a heat shielding function for a vehicle, in which the hot melt film having the heat shielding function is attached to the both surfaces of the complex layer, or when the headlining is installed at the vehicle, the hot melt film is attached to an outer surface (facing the roof panel) of a polyethylene terephthalate (PET) scrim layer which is the most adjacent to the roof panel so that the heat is shielded in twice, or is shielded at a place which is the most adjacent to a heat source, and thus the heat shielding effect is further increased, and a manufacturing method thereof.

According to an aspect of the present invention, there is provided a manufacturing method of a headlining having a heat shielding function for a vehicle, including stacking, in turn, an outer layer 10, a first hot melt film 20, a complex layer 30 formed of glass fiber and polypropylene (PP), a second hot melt film 40 and a polyethylene terephthalate (PET) scrim layer 50, and heating them for 50 to 100 seconds at 190 to 205° C. using an oven; and pressing them for 20 to 40 seconds at a pressure of 1 to 2 bar in a cold forming mold, and integrally forming them, wherein at least one of both surfaces of at least one of the first hot melt film 20 and the second hot melt film 40 is coated with a heat shielding material having a thickness of 1 to 20 µm, and the heat shielding material contains a modified polyacrylic resin of 5.0 to 10.0 weight %, carbon nanotube of 9.9 to 20.0 weight %, alcohol of 65.0 to 85.0 weight % and an additive of 0.1 to 5.0 weight %.

The outer layer 10 may be formed of non-woven fabric, suede or cloth.

Each of the first hot melt film 20 and the second hot melt film 40 may have a thickness of 30 to 50 µm, and may be formed in a multilayered structure in which polyolefin, EVA and polyamide-based resins are stacked.

The carbon nanotube may be multi-wall carbon nanotube having a diameter of 10 to 30 nm and a length of 20 to 40 µm.

The complex layer 30 may have a weight of 500 to 2,000 g/m$^2$ and a thickness of 3 to 10 mm. And the complex layer 30 may contain the glass fiber which is 30 to 70% of a total weight ratio.

The PET scrim layer 50 may have a weight of 20 to 40 g/m$^2$.

The second hot melt film 40 for heat-shield may be provided at an outer surface of the PET scrim layer 50, when the heat shielding material is coated.

According to another aspect of the present invention, there is provided a headlining for a vehicle manufactured by the manufacturing method of a headlining for a vehicle, which has the heat shielding function described above.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

[Detailed Description of Main Elements]

| | |
|---|---|
| 10: outer layer | 20: first hot melt film |
| 30: complex layer | 40: second hot melt film |
| 50: PET scrim layer | |

DETAILED DESCRIPTION OF VARIOUS EMBODIMENTS OF THE INVENTION

Hereinafter, exemplary embodiments of the present invention will be described in detail below with reference to the accompanying drawings. It should be understood that the terms used in the specification and the appended claims should not be construed as limited to general and dictionary meanings, but should be interpreted based on the meanings and concepts corresponding to technical aspects of the present invention on the basis of the principle that the inventor is allowed to define terms appropriately for the best explanation.

Therefore, the description proposed herein is just a preferable example for the purpose of illustrations only, not intended to limit the scope of the invention, so it should be understood that other equivalents and modifications could be made thereto without departing from the spirit and scope of the invention.

(Method of Manufacturing Headlining)

Figure 3:
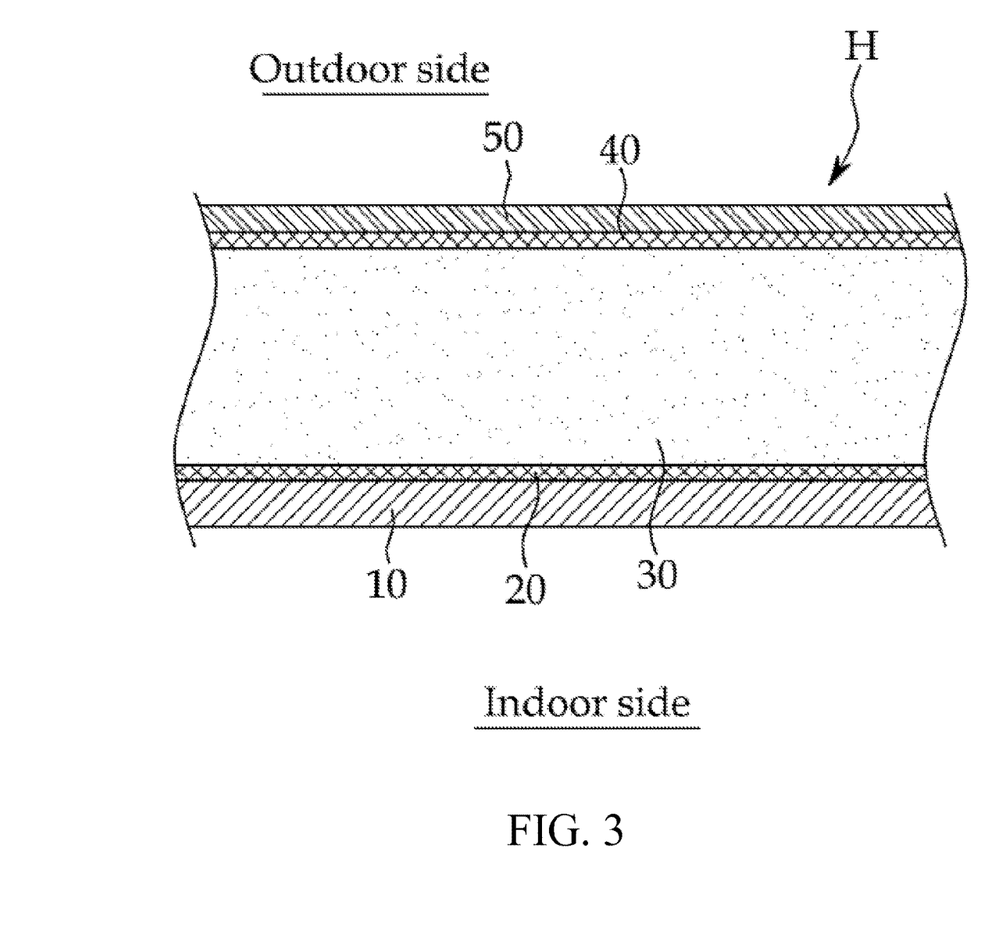
FIG. 3 is a partly enlarged cross-sectional view illustrating a layer structure of a headlining manufactured by a method of manufacturing the headlining according to the present invention.
Figure 4:
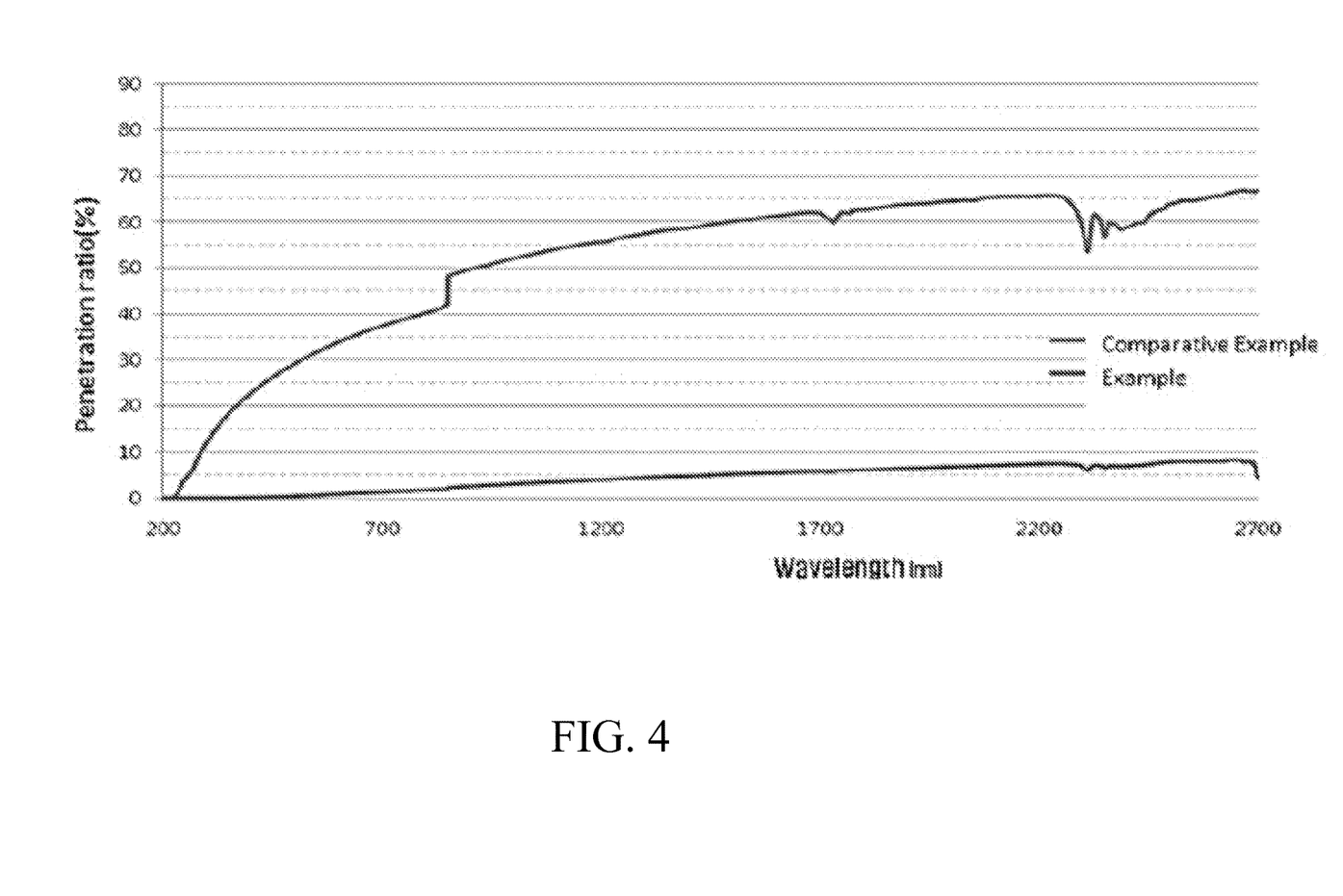
FIG. 4 is a graph comparing a heat shielding performance between a hot melt film (Comparative Example) which is not coated with a heat shielding material and a holt melt film (Example) coated with the heat shielding material according to the present invention.
Figure 5:
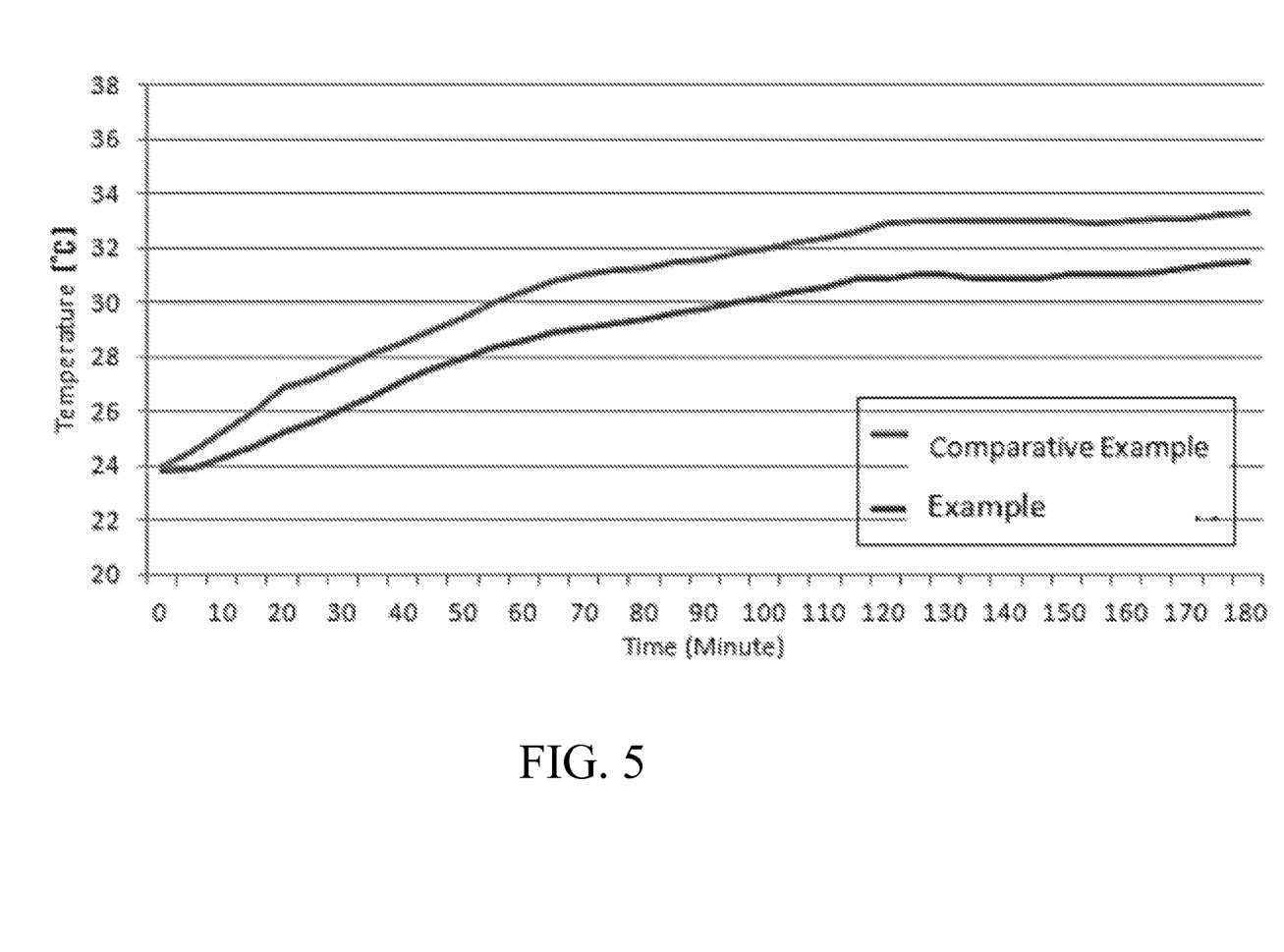
FIG. 5 is a graph illustrating temperatures of a test specimen (Example) manufactured by the manufacturing method according to the present invention and a test specimen (Comparative Example) manufactured by a conventional manufacturing method, which are measured by a heat-shield measuring apparatus over time.

In a manufacturing method of a headlining having a heat shielding function for a vehicle according to the present invention, as illustrated in FIGS. 3 to 5, an outer layer 10, a first hot melt film 20, a complex layer 30 formed of glass fiber and polypropylene (PP), a second hot melt film 40 and a polyethylene terephthalate (PET) scrim layer 50 are stacked in turn, heated for a predetermined period of time under a predetermined temperature condition, and then integrally molded by a press-molding process at a predetermined pressure for a predetermined period of time.

Particularly, in the present invention, since the hot melt film used to attach the complex layer 30 and the PET scrim layer 50 is coated with a heat shielding material to provide a heat shielding effect, heat introduced into an inside of a vehicle from an outside is shielded by the headlining installed to face a roof panel, and thus an internal temperature of the vehicle may be partly prevented from being increased.

More specifically, the manufacturing method of the headlining according to the present invention includes an operation of staking, in turn, the outer layer 10, the first hot melt film 20, the complex layer 30 formed of the glass fiber and the PP, the second hot melt film 40 and the PET scrim layer 50, and an operation of applying heat to a multilayered structure, and then integrally forming the multilayered structure through a press-molding process. Here, each layer will be described first (I), and then a molding condition in which heat and pressure are applied will be described (II). After that, a heat-shield comparison test (III) of the headlining according to the present invention and Comparative Example in which the hot melt film for heat-shield is not provided will be described.

I. Layer Structure

As illustrated in FIG. 3, the outer layer 10 is a portion which is exposed to the inside of the vehicle when a headlining H is installed at an inside of the roof panel. The outer layer 10 may be formed of a general finishing material, which is used when the headlining is manufactured to provide a finishing function and a buffer function and to create an atmosphere. For example, the outer layer 10 may be formed in a single layered structure having one of non-woven fabric, suede and cloth, or may be formed in a multilayered structure having at least two of them.

As illustrated in FIG. 3, the first hot melt film 20 is put on the outer layer 10. A hot melt film which is manufactured by a conventional technique and used for an adhering or sealing purpose may be used, but the first hot melt film 20 is not limited thereto. For example, in the present invention, the first hot melt film 20 may be formed in a multilayered structure in which polyolefin, EVA and polyamide-based resins are stacked.

As illustrated in FIG. 3, the first hot melt film 20 serves as an adhesive between the outer layer 10 and the complex layer 30 to be described later. Therefore, the first hot melt film 20 may be formed to have a thickness of, for example, 30 to 50 µm which can adhere the layers.

As illustrated in FIG. 3, the complex layer 30 is manufactured of a material which complements the heat-shield, reinforces strength of the whole headlining and also absorbs noise or the like. For example, the complex layer 30 may be formed of a material in which the PP and the glass fiber are mixed.

At this time, in a preferable embodiment of the present invention, the complex layer 30 may include the glass fiber which is 30 to 70% of a total weight ratio and the PP which is the rest of the total weight ratio. This allows the headlining to be manufactured according to a vehicle type, while the weight ratio is appropriately controlled in consideration of a heat penetration amount through the roof panel.

Also, in the preferable embodiment of the present invention, the complex layer 30 may have a weight of 500 to 2,000 g/m$^2$ and a thickness of 3 to 10 mm. This allows the complex layer 30 to perform the heat shielding and reinforcing functions, also allows an increase in a weight thereof to be minimized, and thus allows the vehicle to have a minimum fuel consumption.

As illustrated in FIG. 3, the second hot melt film 40 may use a hot melt film, which is manufactured by the conventional technique and used for an adhering or sealing purpose, to adhere the complex layer 30 and the PET scrim layer 50 to be described later. The second hot melt film 40 may use the same hot melt film as that of the first hot melt film 20.

Meanwhile, the second hot melt film 40 may be configured so that the heat shielding material is coated on at least one surface thereof to have a predetermined thickness and thus to increase the heat shielding effect. Here, it has been described that the heat shielding material is coated on only the second hot melt film 40. However, the first hot melt film 20 may be coated with the heat shielding material in the same manner as that of the second hot melt film 40.

The heat shielding material used in the preferable embodiment of the present invention may include a modified polyacrylic resin of 5.0 to 10.0 weight %, carbon nanotube of 9.9 to 20.0 weight %, alcohol of 65.0 to 85.0 weight % and an additive of 0.1 to 5.0 weight %.

Also, in the preferable embodiment of the present invention, the carbon nanotube may be multi-wall carbon nanotube having a diameter of 10 to 30 nm and a length of 20 to 40 µm.

In the preferable embodiment of the present invention, the heat shielding material may be formed at at least one of both surfaces of the second hot melt film 40 to have a thickness of 1 to 20 µm to minimize an increase in a weight thereof and also to sufficiently perform the heat shielding function.

It has been described that the second hot melt film 40 is interposed between the complex layer 30 and the PET scrim layer 50, but the present invention is not limited thereto. Therefore, even when the PET scrim layer 50 is put on the complex layer 30, and the second hot melt film 40 is stacked thereon, and the heat is applied, and then a molding process thereof is performed while the pressure is applied, the second hot melt film 40 passes through the PET scrim layer 50 formed in a mesh shape and infiltrates therein, and thus the heat shielding effect may be obtained, while the layers are fixed. Therefore, the second hot melt film 40 may be located to be the most adjacent to the roof panel, and thus the heat shielding effect may be further increased.

Meanwhile, a penetration ratio of the heat shielding material according to the present invention is as follows. FIG. 4 is a result in which the penetration ratios (y-axis, %) with respect to a wavelength (x-axis, nm) in Example according to the present invention and a conventional Comparative Example are measured using a measuring apparatus (Iasco V-670). Here, the wavelength is varied within a range of 200 to 2,700 nm, and Comparative Example (indicated by a blue color) in a graph indicates only the hot melt film, and Example (indicated by a yellow color) indicates the hot melt film of which one surface is coated with the heat shielding material according to the present invention. As a result, it may be understood that Example generally has a lower penetration ratio and thus a higher heat shielding effect than Comparative Example, as illustrated in FIG. 4. In particular, in a ultraviolet region (700 to 2,500 nm), Example has a penetration ratio of 10% or less, and thus shields the heat of 90% or more, and Comparative Example has a penetration ratio of 40 to 60%, and thus shields the heat of about 50%.

As illustrated in FIG. 3, the PET scrim layer 50 is stacked on the second hot melt film 40. Typically, a scrim is manufactured in a mesh or lattice shape, and used to complement the strength. In the present invention, the scrim is formed of polyethylene terephthalate (PET), and used to complement structural strength of the complex layer 30 and also to additionally obtain an insulating effect of the PET.

It is preferable to use the PET scrim layer 50 which has a weight of 20 to 40 g/m$^2$ to satisfy the strength required for the headlining and to minimize the increase in the weight thereof.

II. Molding Condition of Heat and Pressure

In a molding condition of the heat and the pressure according to the present invention, each of the outer layer 10, the first hot melt film 20, the complex layer 30, the second hot melt film 40 and the PET scrim layer 50 is stacked in turn, heated for the predetermined period of time under the predetermined temperature condition, and then integrally molded by the press-molding process at the predetermined pressure for the predetermined period of time.

To perform the heating process, a member having the multilayered structure is put into an oven, heated for 50 to 100 seconds under a temperature condition of 190 to 205° C., and then press-molded for 20 to 40 seconds at a pressure of 1 to 2 bar using a cold forming mold. At this time, the oven may be an infrared (IR) oven.

III. Heat-Shield Comparison Test

As illustrated in FIG. 5, in the heat-shield comparison test, Comparative Example in which the second hot melt film for the heat-shield is not attached to the complex layer, and Example in which the second hot melt film is attached to the complex layer are manufactured in a sample specimen shape, and then the heat-shield is measured using the heat-shield measuring apparatus.

FIG. 5 is a graph in which the temperatures (y-axis) in Comparative Example (indicated by a blue color) and Example (indicated by a yellow color) are measured according to a change in time (x-axis). At this time, each of the sample specimens (250×250 mm) is put into the measuring apparatus under a test condition having a temperature of 24° C. and a humidity of 50%, and then the temperature is measured at every five-minute interval for 180 minutes.

As a result, as illustrated in FIG. 5, it may be understood that Example generally has a lower temperature than Comparative Example, and in particular, a temperature difference between Example and Comparative Example is gradually increased, as time passes. It may be also understood that Example has the temperature which is lower than that of Comparative Example by 3 to 5° C.

(Headlining)

The present invention includes the headlining manufactured by the above-described manufacturing method. The headlining according to the present invention has the higher heat shielding effect than the conventional headlining, and thus may further reduce the internal temperature of the vehicle.

The headlining having the heat shielding function for the vehicle and the manufacturing method thereof according to the present invention has the following effects:

(1) Since the headlining installed inside the roof panel has the multilayered structure, and forms the heat shielding layer which can obtain the heat shielding effect, the heat transferred into the inside of the vehicle through the roof panel may be shielded.

(2) In particular, since the heat is shielded and thus the increase in the internal temperature of the vehicle is prevented, it is possible to arrive at a required cooling temperature within a short period of time, when the air conditioner is operated, and an energy consumption for operating the air conditioner can be reduced, and thus the fuel efficiency of the vehicle can be enhanced.

(3) Even when an article, such as a canned drink or a lighter, which may be exploded as the internal temperature of the vehicle is increased, is placed at the inside of the vehicle, such an explosion accident can be reduced.

(4) Meanwhile, since the present invention uses the hot melt film which can shield the heat, the heat shielding effect can be further enhanced by the headlining having a simple structure.

(5) At this time, since the heat shielding material is added to the hot melt film for heat-shield, the heat shielding performance can be increased, while the increase in the weight of the hot melt film can be minimized, and thus the fuel efficiency can be also increased.

(6) In addition, since the carbon nanotube is added to the heat shielding material, the heat shielding effect can be increased by the carbon nanotube having heat shielding ability. In particular, since the carbon nanotube is light, the heat shielding effect can be further increased, compared with the weight thereof.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A headlining having a heat shielding function for a vehicle, said headlining comprising:
    an outer layer,
    a first hot melt film,
    a complex layer formed of glass fiber and polypropylene (PP),
    a second hot melt film, and
    a polyethylene terephthalate (PET) scrim layer,
    wherein said headlining is formed as a multi-layer structure and integrally formed by stacking, in turn, the outer layer, the first hot, melt film, the complex layer formed of glass fiber and polypropylene (PP), the second hot melt film, and the polyethylene terephthalate (PET) scrim layer, and heating the layers for 50 to 100 seconds at 190 to 205° C. using an oven, and pressing them for 20 to 40 seconds at a pressure of 1 to 2 bar in a cold forming mold,
    wherein at least one of both surfaces of at least one of the first hot melt film and the second hot melt film is coated with a heat shielding material having a thickness of 1 to 20 μm, and the heat shielding material contains a modified polyacrylic resin of 5.0 to 10.0 weight %, carbon nanotube of 9.9 to 20.0 weight %, alcohol of 65.0 to 85.0 weight % and an additive of 0.1 to 5.0 weight %.

2. The headlining of claim 1, wherein the outer layer is formed of non-woven fabric, suede or cloth.

3. The headlining of claim 1, wherein each of the first hot melt film and the second hot melt film has a thickness of 30 to 50 μm, and is formed in a multilayered structure in which polyolefin, EVA and polyamide-based resins are stacked.

4. The headlining of claim 1, wherein the carbon nanotube is multi-wall carbon nanotube having a diameter of 10 to 30 nm and a length of 20 to 40 μm.

5. The headlining of claim 1, wherein the complex layer has a weight of 500 to 2,000 g/m² and a thickness of 3 to 10 mm.

6. The headlining of claim 1, wherein the complex layer contains the glass fiber which is 30 to 70% of a total weight ratio.

7. The headlining of claim 1, wherein the PET scrim layer has a weight of 20 to 40 g/m².

8. The headlining of claim 1, wherein the second hot melt film for heat-shield is provided at an outer surface of the PET scrim layer, when the heat shielding material is coated.

* * * * *